United States Patent
Kim et al.

(10) Patent No.: US 9,818,233 B2
(45) Date of Patent: Nov. 14, 2017

(54) METHOD AND APPARATUS FOR AUTOMATICALLY SPLITTING OBJECT AND METHOD, APPARATUS, AND SYSTEM FOR REGISTERING FILE

(71) Applicant: MARKANY INC., Seoul (KR)

(72) Inventors: Hyoung Jun Kim, Seoul (KR); Jae Hong Kim, Gyeonggi-do (KR); Kyu Sun Cho, Seoul (KR); Jong Uk Choi, Seoul (KR)

(73) Assignee: MARKANY INC., Seoul (KR)

( * ) Notice: Subject to any disclaimer, the term of this patent is extended or adjusted under 35 U.S.C. 154(b) by 33 days.

(21) Appl. No.: 15/013,254

(22) Filed: Feb. 2, 2016

(65) Prior Publication Data

US 2017/0161959 A1 Jun. 8, 2017

(30) Foreign Application Priority Data

Dec. 7, 2015 (KR) ........................ 10-2015-0173183

(51) Int. Cl.
*G06T 19/20* (2011.01)
*B33Y 50/00* (2015.01)

(52) U.S. Cl.
CPC .............. *G06T 19/20* (2013.01); *B33Y 50/00* (2014.12); *G06T 2219/2008* (2013.01)

(58) Field of Classification Search
None
See application file for complete search history.

(56) References Cited

U.S. PATENT DOCUMENTS

| | | | | |
|---|---|---|---|---|
| 2011/0087350 A1* | 4/2011 | Fogel | ...................... | G06F 17/50 700/98 |
| 2012/0281013 A1* | 11/2012 | Mahdavi | ................. | G06F 17/50 345/619 |
| 2014/0375636 A1* | 12/2014 | Young | ..................... | G06F 17/50 345/420 |

FOREIGN PATENT DOCUMENTS

KR 10-2009-0044144 5/2009

* cited by examiner

*Primary Examiner* — Mark Zimmerman
*Assistant Examiner* — Nurun N Flora
(74) *Attorney, Agent, or Firm* — Occhiuti & Rohlicek LLP

(57) ABSTRACT

Provided are a method and apparatus for automatically splitting an object and a method, apparatus, and system for registering a file. The method for splitting an object includes receiving the data of a stereolithography (STL) file representing a 3D image, tagging vertex coordinates corresponding to objects included in the 3D image so that the vertex coordinates are classified for each object, and splitting each of the objects included in the 3D image based on the tagged vertex coordinates.

16 Claims, 9 Drawing Sheets

FIG. 6

```
       solid
FA ─── facet normal 1.00000000e+000  0.00000000e+000  0.00000000e+000
          outer loop
VE1 ───    vertex -3.19391098e+001  1.92235909e+001  7.19949265e+001
VE2 ───    vertex -3.19391098e+001  1.92235909e+001  7.19949265e+001
VE3 ───    vertex -2.85583401e+001  1.77818699e+001  7.14655914e+001
TA  ───   endloop
          endfacet
       facet normal 1.42953500e-001 -2.80249193e-002  9.89332616e-001
          outer loop
             vertex -2.85583401e+001  1.77818699e+001  7.14655914e+001
             vertex -2.82757092e+001  1.92235909e+001  7.14655914e+001
             vertex -3.19391098e+001  1.92235909e+001  7.19949265e+001
          endloop
       endfacet
       facet normal 9.73332524e-001 -1.90814197e-001 -1.27333298e-001
          outer loop
             vertex -2.82757092e+001  1.92235909e+001  7.14655914e+001
             vertex -2.85583401e+001  1.77818699e+001  7.14655914e+001
             vertex -2.87135105e+001  1.78482609e+001  7.01800385e+001
          endloop
       endfacet
       facet normal 9.73327518e-001 -1.90907806e-001 -1.27231494e-001
          outer loop
             vertex -2.87135105e+001  1.78482609e+001  7.01800385e+001
             vertex -2.84437504e+001  1.92235909e+001  7.01800385e+001
             vertex -2.82757092e+001  1.92235909e+001  7.14655914e+001
          endloop
       endfacet
       facet normal 7.47043371e-001 -1.46524593e-001 -6.48426414e-001
          outer loop
             vertex -2.84437504e+001  1.92235909e+001  7.01800385e+001
             vertex -2.87135105e+001  1.78482609e+001  7.01800385e+001
             vertex -2.99853992e+001  1.83912392e+001  6.85920105e+001
          endloop
       endfacet
```

METHOD AND APPARATUS FOR AUTOMATICALLY SPLITTING OBJECT AND METHOD, APPARATUS, AND SYSTEM FOR REGISTERING FILE

Priority to Korean patent application number 10-2015-0173183 filed on Dec. 7, 2015, the entire disclosure of which is incorporated by reference herein, is claimed.

BACKGROUND OF THE INVENTION

Field of the Invention

The present invention relates to a method and apparatus for automatically splitting an object and a method, apparatus, and system for registering a file and, more particularly, to a technology for automatically splitting an object, wherein the object of a stereolithography (STL) file for micro licensing is automatically split.

Discussion of the Related Art

With the recent development of the digital technology, a three-dimensional (3D) modeling technology is actively carried out. The 3D modeling technology may be said to be a technology that is a basis for the 3D printing field in which a stereoscopic structure is output in a stack way. There is a possibility that 3D printing may be applied to almost all of fields, such as machines, vehicles, and medical treatment, in addition to simple apparatuses or structures. Accordingly, it is expected that the importance of a 3D printing industry market will be rapidly expanded in all the industries in the future.

3D modeling data may be written in various formats, but graphic data to be used in 3D printing may be commonly stored in a stereolithography (STL) file format. An STL file has a file format which is provided to store data modeled in a 3D way in a standard format and which has been predetermined to be used as a standard in the 3D printer.

A common 3D plan is an aggregate of mathematical models having modeling data and vector values, such as various shapes, colors, and materials. In contrast, an STL plan has only to be written by considering a surface of an object as a plane of a plurality of triangles. That is, in an STL plan, a surface of a target object is formed of a combination of a plurality of triangles. Data for representing a combination of a plurality of triangles includes points of X, Y, and Z values and the normal vectors of the triangles. In this case, the normal vector determines whether the plane of a triangular is directed inward or outward.

As the 3D printing industry is rapidly expanded, the value of a 3D plan rises, and thus the importance of a copyright problem according to the unlawful stealing of a 3D plan is increased. In general, an STL plan is registered with and managed by a copyright registration system. An STL plan may represent a thing of a form in which a plurality of objects has been combined. For example, a kettle includes three objects, such as a kettle body, a discharge unit from which water is output, and a kettle cover. An STL plan may be written in the form of a combined subject of modeled objects by modeling each of the three objects.

If an STL plan representing a thing in which a plurality of objects has been combined as described above is registered with a copyright registration system, however, only the copyright of the combined subject is recognized, but there is a portion that it is difficult to assert the copyright of each object. Accordingly, there is a problem in that damage cannot be relieved although only the shape of an object forming a thing is illegally pirated.

SUMMARY OF THE INVENTION

The present invention provides a method and apparatus for splitting an object, which are capable of easily splitting an STL plan for each object and a method, apparatus, and system for registering a file based on the method and apparatus for splitting an object.

In an aspect, there is provided a method for splitting an object. The method for splitting an object using an apparatus for splitting an object includes receiving the data of a stereolithography (STL) file representing a 3D image, tagging vertex coordinates corresponding to objects included in the 3D image so that the vertex coordinates are classified for each object, and splitting each of the objects included in the 3D image based on the tagged vertex coordinates.

Tagging the vertex coordinates corresponding to the objects may include a start vertex coordinate selection step of selecting any one vertex coordinate which has not been tagged from the data of the STL file as a start vertex coordinate, a start vertex coordinate tagging step of tagging all of vertex coordinates having the start vertex coordinate using a first value by tracing the vertex coordinates, a reference vertex coordinate selection step of selecting at least one vertex coordinate which is connected to the tagged vertex coordinates and which has not been tagged as a reference vertex coordinate, a reference vertex coordinate tagging step of tagging all of vertex coordinates having the selected at least one reference vertex coordinate using the first value by tracking the vertex coordinates, and a repetitive execution step of repeatedly performing the reference vertex coordinate selection step and the reference vertex coordinate tagging step until a vertex coordinate which is connected to the tagged vertex coordinates and which has not been tagged is not present. Splitting each of the objects may include determining a combination of triangles including the vertex coordinates tagged using the first value to be a first object.

The method for splitting an object may further include repeatedly performing the start vertex coordinate selection step, the start vertex coordinate tagging step, the reference vertex coordinate selection step, the reference vertex coordinate tagging step, and the repetitive execution step on the vertex coordinates that have not yet been tagged after the repetitive execution step of repeatedly performing the reference vertex coordinate selection step is completed. A second value may be used when the tagging is performed. Splitting each of the objects may include determining a combination of triangles including the vertex coordinates tagged using the second value to be a second object different from the first object.

The method for splitting an object may further include generating a first STL file representing the first object and a second STL file representing the second object.

In another aspect, there is provided an apparatus for splitting an object. The apparatus for splitting an object may include an input unit configured to receive the data of a stereolithography (STL) file representing a 3D image, a tagging unit configured to tag vertex coordinates corresponding to objects included in the 3D image so that the vertex coordinates are classified for each object, and a split unit configured to split each of the objects included in the 3D image based on the tagged vertex coordinates.

The tagging unit may perform start vertex coordinate selection for selecting any one vertex coordinate which has not been tagged from the data of the STL file as a start vertex coordinate, start vertex coordinate tagging for tagging all of vertex coordinates having the start vertex coordinate using a first value by tracing the vertex coordinates, reference vertex coordinate selection for selecting at least one vertex coordinate which is connected to the tagged vertex coordinates and which has not been tagged as a reference vertex coordinate, and reference vertex coordinate tagging for tagging all of vertex coordinates having the selected at least one reference vertex coordinate using the first value by tracing the vertex coordinates. The tagging unit may perform repetitive execution for repeatedly performing the reference vertex coordinate selection and the reference vertex coordinate tagging until a vertex coordinate which is connected to the tagged vertex coordinates and which has not been tagged is not present. The split unit may determine a combination of triangles including the vertex coordinates tagged using the first value to be a first object.

The tagging unit may repeatedly perform the start vertex coordinate selection, the start vertex coordinate tagging, the reference vertex coordinate selection, the reference vertex coordinate tagging, and the repetitive execution on the vertex coordinates that have not yet been tagged after the repetitive execution for repeatedly performing the reference vertex coordinate selection is completed. The tagging unit uses a second value when performing the tagging. The split unit may determine a combination of triangles including the vertex coordinates tagged using the second value to be a second object different from the first object.

The apparatus for splitting an object may further include a file generation unit configured to generate a first STL file representing the first object and a second STL file representing the second object.

In another aspect, there is provided a method for registering a file. The method for registering a file using an apparatus for registering a file may include receiving the data of a stereolithography (STL) file representing a 3D image of a combined subject from a client terminal, tagging vertex coordinates corresponding to objects included in the 3D image so that the vertex coordinates are classified for each object, splitting each of the objects included in the 3D image based on the tagged vertex coordinates, and associating the combined subject and each of the split objects with file information and storing the combined subject and the split objects associated with the file information in a database.

Tagging the vertex coordinates corresponding to the objects may include a start vertex coordinate selection step of selecting any one vertex coordinate which has not been tagged from the data of the STL file as a start vertex coordinate, a start vertex coordinate tagging step of tagging all of vertex coordinates having the start vertex coordinate using a first value by tracing the vertex coordinates, a reference vertex coordinate selection step of selecting at least one vertex coordinate which is connected to the tagged vertex coordinates and which has not been tagged as a reference vertex coordinate, a reference vertex coordinate tagging step of tagging all of vertex coordinates having the selected at least one reference vertex coordinate using the first value by tracing the vertex coordinates, and a repetitive execution step of repeatedly performing the reference vertex coordinate selection step and the reference vertex coordinate tagging step until a vertex coordinate which is connected to the tagged vertex coordinates and which has not been tagged is not present.

The method for registering a file may further include repeatedly performing the start vertex coordinate selection step, the start vertex coordinate tagging step, the reference vertex coordinate selection step, the reference vertex coordinate tagging step, and the repetitive execution step on the vertex coordinates that have not yet been tagged after the repetitive execution step of repeatedly performing the reference vertex coordinate selection step is completed, wherein a second value may be used when the tagging is performed.

Splitting each of the objects may include determining a combination of triangles including the vertex coordinates tagged using the first value to be a first object and determining a combination of triangles including the vertex coordinates tagged using the second value to be a second object.

The method for registering a file may further include generating a first STL file representing the first object and a second STL file representing the second object.

In yet another aspect, there is provided an apparatus for registering a file. The apparatus for registering a file may include a reception unit configured to receive the data of a stereolithography (STL) file representing a 3D image of a combined subject from a client terminal, an object split unit configured to tag vertex coordinates corresponding to objects included in the 3D image so that the vertex coordinates are classified for each object and to split each of the objects included in the 3D image based on the tagged vertex coordinates, and a registration unit configured to associate the combined subject and each of the split objects with file information and to store the combined subject and the split objects associated with the file information in a database.

The object split unit may perform start vertex coordinate selection for selecting any one vertex coordinate which has not been tagged from the data of the STL file as a start vertex coordinate, start vertex coordinate tagging for tagging all of vertex coordinates having the start vertex coordinate using a first value by tracing the vertex coordinates, reference vertex coordinate selection for selecting at least one vertex coordinate which is connected to the tagged vertex coordinates and which has not been tagged as a reference vertex coordinate, and reference vertex coordinate tagging for tagging all of vertex coordinates having the selected at least one reference vertex coordinate using the first value by tracking the vertex coordinates. The object split unit may perform repetitive execution for repeatedly performing the reference vertex coordinate selection and the reference vertex coordinate tagging until a vertex coordinate which is connected to the tagged vertex coordinates and which has not been tagged is not present.

The object split unit may repeatedly perform the start vertex coordinate selection, the start vertex coordinate tagging, the reference vertex coordinate selection, the reference vertex coordinate tagging, and the repetitive execution on the vertex coordinates that have not yet been tagged after the repetitive execution for repeatedly performing the reference vertex coordinate selection is completed. The object split unit may use a second value when performing the tagging.

The object split unit may determine a combination of triangles including the vertex coordinates tagged using the first value to be a first object and determine a combination of triangles including the vertex coordinates tagged using the second value to be a second object. The object split unit may generate a first STL file representing the first object and a second STL file representing the second object.

In further yet another aspect, there is provided a system for registering a file. The system for registering a file may include a first server unit configured to manage a database and a second server unit configured to receive the data of a stereolithography (STL) file representing a 3D image of a combined subject from a client terminal, tag vertex coordinates corresponding to objects included in the 3D image so that the vertex coordinates are classified for each object, split each of the objects included in the 3D image based on the tagged vertex coordinates, and associate the combined subject and each of the split objects with file information and storing the combined subject and the split objects associated with the file information in a database.

As described above, in accordance with the present invention, a 3D image of an STL file can be automatically split easily for each object. Furthermore, file information can be associated with each of objects forming a target in addition to the target when the file is registered through such object splitting.

BRIEF DESCRIPTION OF THE DRAWINGS

FIG. 6 is an exemplary diagram illustrating the data of an STL file in order to describe the data of the STL file.

DETAILED DESCRIPTION OF THE INVENTION

Figure 1:
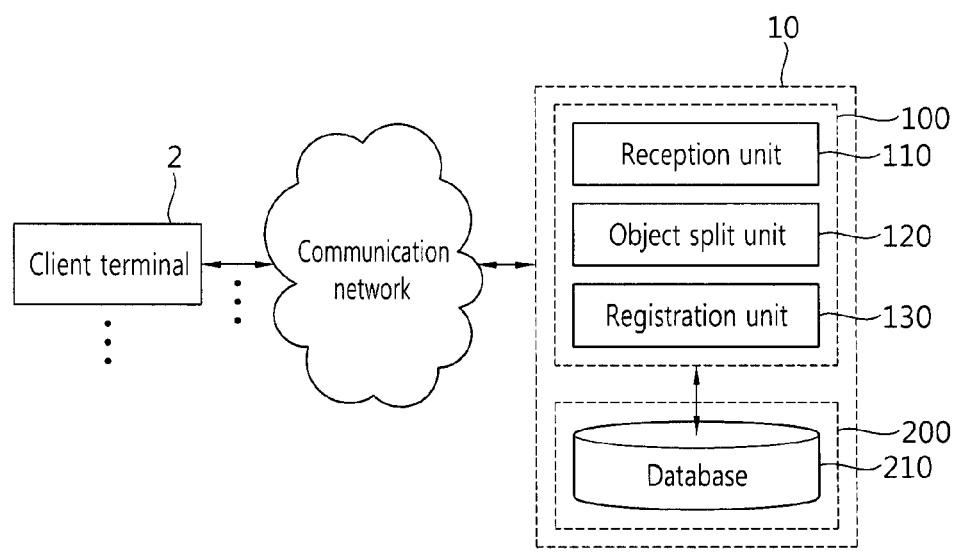
FIG. 1 is a block diagram showing a copyright registration system including an apparatus for splitting an object according to an embodiment of the present invention.

The present invention may be modified in various ways and may be implemented to have several embodiments. Specific embodiments are illustrated in the drawings and are described in detail. It is however to be understood that the present invention is not intended to be limited to the specific embodiments and the present invention includes all modifications, equivalents, and substitutions which fall within the spirit and technical scope of the present invention.

Terms, such as the first and the second, may be used to describe various elements, but the elements should not be restricted by the terms. The terms are used to only distinguish one element from the other element. For example, a first element may be named a second element without departing from the scope of the present invention. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

All terms used herein, unless otherwise defined, have the same meanings as those typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Hereinafter, preferred embodiments of the present invention are described in more detail with reference to the accompanying drawings. In describing the present invention, in order to help general understanding, the same reference numerals are used to denote the same elements throughout the drawings, and a redundant description of the same elements is omitted.

FIG. 1 is a block diagram showing a copyright registration system including an apparatus for splitting an object according to an embodiment of the present invention.

As shown in FIG. 1, the system 10 for registering a file operates in conjunction with at least one client terminal 2 over a communication network. The system 10 for registering a file may include a file registration server unit 100 and a database server unit 200. The file registration server unit 100 and the database server unit 200 are implemented based on one or a plurality of computers.

The file registration server unit 100 may access the client terminal 2 and store a copyright work, transmitted by the client terminal 2, in the database 210 of the database server unit 200 in association with file information, thus being capable of registering the copyright work and managing information about the registered copyright work and file.

Figure 2:
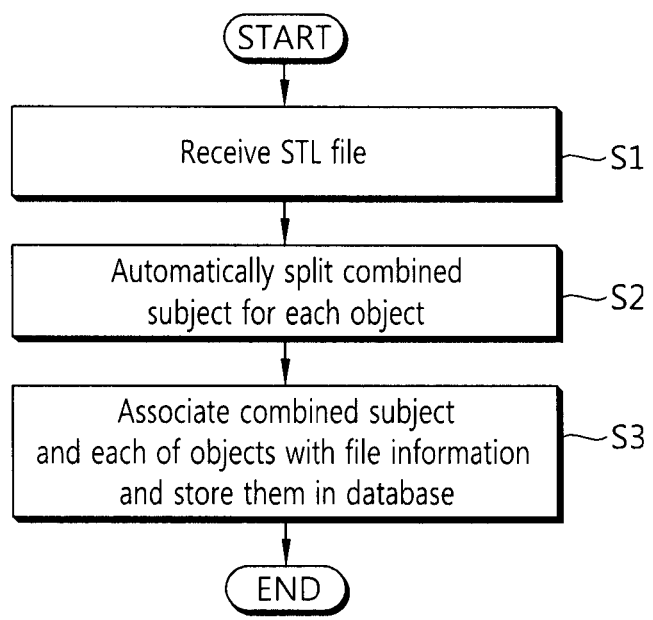
FIG. 2 is a flowchart illustrating a flow of the operation of a file registration server unit shown in FIG. 1.

FIG. 2 is a flowchart illustrating a flow of the operation of the file registration server unit 100 shown in FIG. 1.

Referring to FIGS. 1 to 2, the file registration server unit 100 may include a reception unit 110, an object split unit 120, and a registration unit 130. Each of the elements may be implemented through an independent computer terminal, or all of the elements may be included in a single computer terminal. The computer terminal may include an interface device for communication, at least one computing processor, and a recording medium readable by the computing processor. The recording medium may include all types of recording devices in which data readable by a computer system is stored.

First, the reception unit 110 may receive a copyright work whose copyright is to be protected, for example, a stereolithography (STL) file from the client terminal 2 at step S1. The copyright work may be the STL file of a 3D image which represents a specific target in a 3D way.

The STL file has a file format which is provided to store data modeled in a 3D way in a standard format and which has been determined to be used as a standard in the 3D printer. In an embodiment of the present invention, the 3D image may be an image that represents a combined subject of a plurality of objects in the STL format.

The object split unit 120 may automatically split a plurality of objects included in the 3D image for each object by processing the received STL file at step S2. For example, the object split unit 120 may tag vertex coordinates corresponding to the objects included in the 3D image so that the vertex coordinates are classified for each object and may split each of the objects included in the 3D image based on the tagging. The object split unit 120 may generate an STL file corresponding to each of the split objects.

The registration unit 130 may store a combined subject, that is, the 3D image of the original STL file, and the objects split by the object split unit 120 in the database 210 by associating the combined subject and each of the objects with corresponding file information at step S3. The file information includes the right of use or policy of the combined subject and each of the objects, and it may have been received from the client terminal 2 and stored in the database 210.

Figure 3:
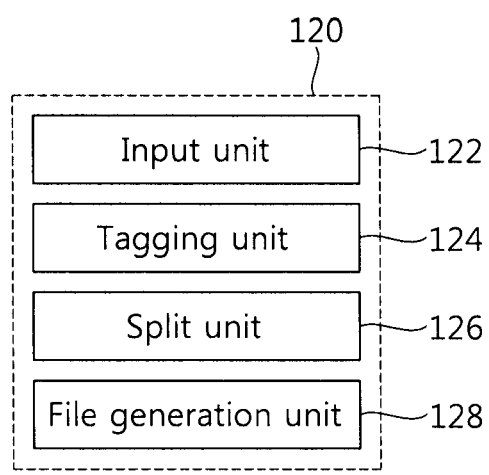
FIG. 3 is a block diagram showing the detailed elements of an object split unit shown in FIG. 1.
Figure 4:
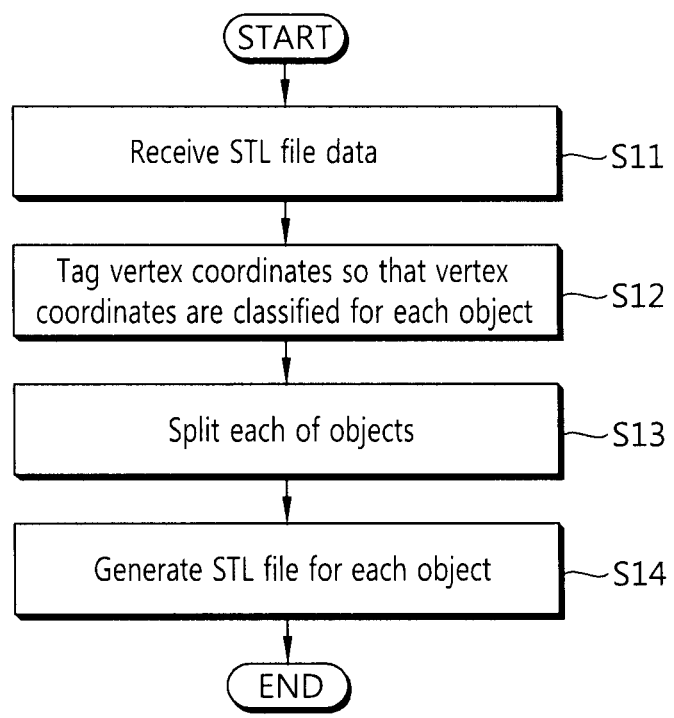
FIG. 4 is a flowchart illustrating an object splitting operation shown in FIG. 3.

FIG. 3 is a block diagram showing the detailed elements of the object split unit 120 shown in FIG. 1, and FIG. 4 is a flowchart illustrating the operation of the object split unit 120 shown in FIG. 3. FIGS. 3 and 4 may show the configuration and operation of the apparatus for splitting an object according to an embodiment of the present invention.

Referring to FIGS. 3 and 4, the object split unit 120 may include an input unit 122, a tagging unit 124, a split unit 126, and a file generation unit 128. The input unit 122 receives the data of an STL file representing a 3D image (i.e., an image of a combined subject) at step S11. That is, the STL file received by the reception unit 110 is transferred to the object split unit 120. The object split unit 120 obtains the data of the STL file.

Figure 5:
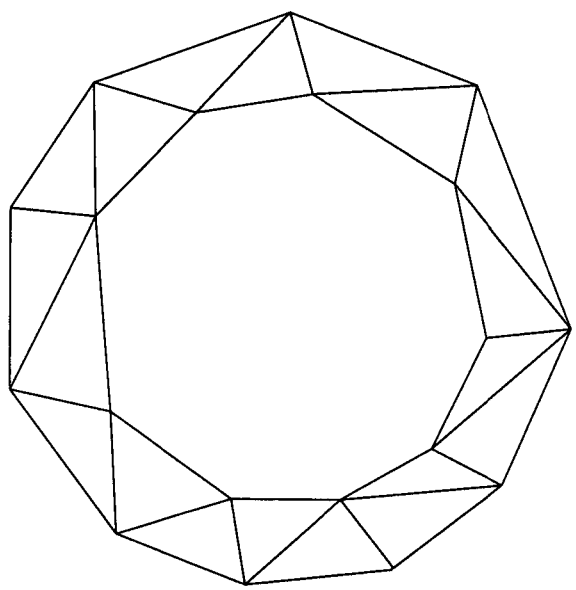
FIG. 5 is an exemplary diagram illustrating an STL 3D image in order to describe a 3D image according to an STL file.

FIG. 5 is an exemplary diagram illustrating an STL 3D image in order to describe a 3D image according to an STL file.

As shown in FIG. 5, the STL 3D image represents a surface of an object in the form of a plane of a plurality of triangles. That is, when an STL file is played back using a viewer, a 3D image representing a target object is displayed. It may be seen that the object is represented by an aggregate of numerous triangles by enlarging the STL 3D image. Accordingly, the data of the STL file for representing the STL 3D image includes unit data which is formed of three vertexes for representing a triangle and a normal vector and which corresponds to the number of triangles.

FIG. 6 is an exemplary diagram illustrating the data of an STL file in order to describe the data of the STL file.

As shown in FIG. 6, the data of the STL file may include unit data TA corresponding to a single triangle. The unit data TA includes three vertex coordinates VE1, VE2, and VE3 and a normal vector FA. Since the vertex coordinates within the unit data TA are indicative of the coordinates of the vertexes of a corresponding triangle, any one vertex coordinate, for example, VE1 is connected to at least two vertex coordinates VE2 and VE3.

The vertex coordinates VE1, VE2, and VE3 may include X coordinate, Y coordinate, and Z coordinate values, respectively, in order to represent spatial coordinate values. When an STL file is played back using an application capable of reading code, such as a notepad, the data of the STL file is displayed.

The tagging unit 124 may tag vertex coordinates, corresponding to objects included in a 3D image, based on data inputted by the input unit 122 so that the vertex coordinates are classified for each object at step S12.

Figure 7:
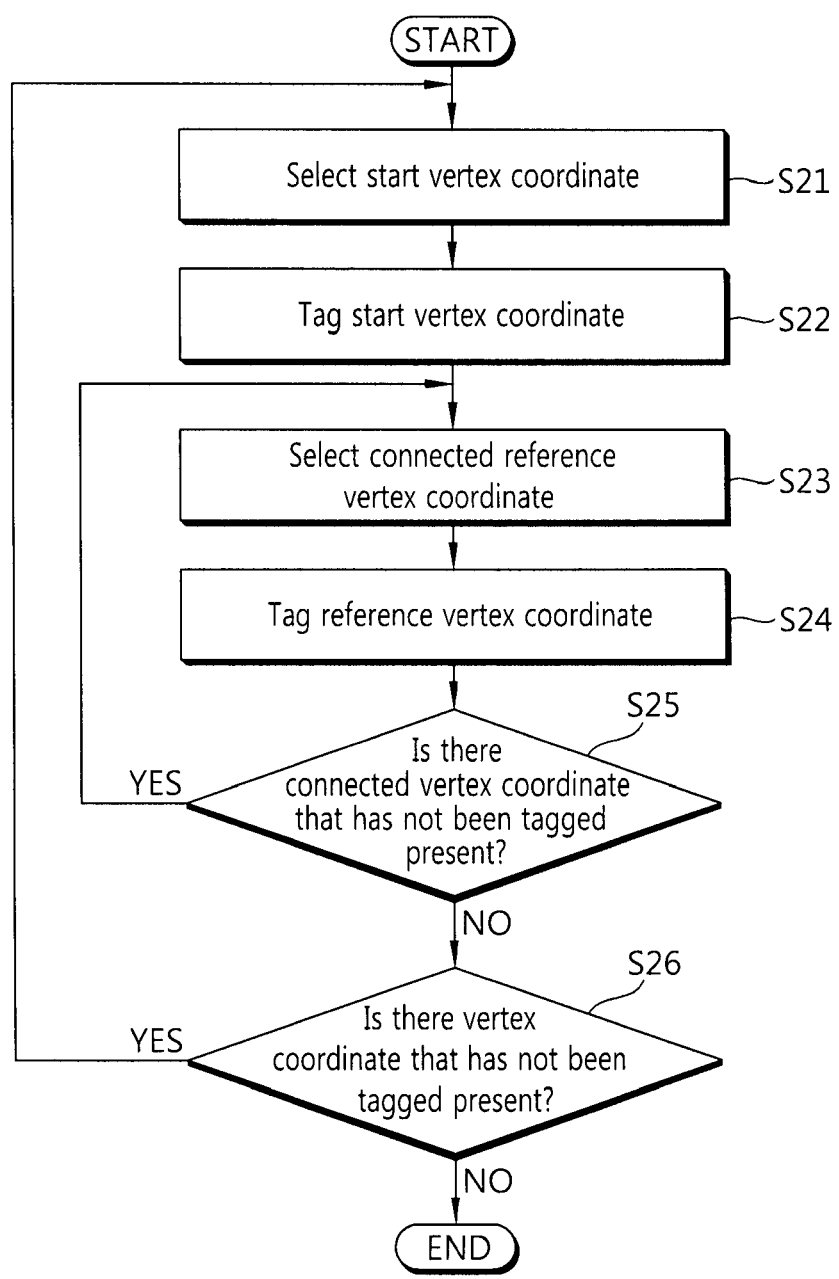
FIG. 7 is a flowchart illustrating a detailed operation of a tagging unit shown in FIG. 3.

FIG. 7 is a flowchart illustrating a detailed operation of the tagging unit 124 shown in FIG. 3.

As shown in FIG. 7, the tagging unit 124 may select any one vertex coordinate that has not been tagged from the data of an STL file as a start vertex coordinate at step S21. For example, the tagging unit 124 may select vertex coordinates a1, b1, and c1 from the data of the STL file as the start vertex coordinates. In this case, the start vertex coordinate may mean the coordinate of a start vertex at which tagging is started.

The tagging unit 124 tags all of vertex coordinates having the start vertex coordinates using a first value by tracking all of the vertex coordinates in the data of the STL file at step S22. For example, the tagging unit 124 may search the data of the STL file for all of vertex coordinates having the same coordinate values as the start vertex coordinates a1, b1 and c1 and may attach a tag indicative of the first value to the retrieved vertex coordinates.

The number of unit data including a vertex coordinate may be plural because the number of triangles sharing one vertex may be plural. Accordingly, all of the start vertex coordinates a1, b1, and c1 included in unit data of the data of the STL file are tagged with the first value through such an operation.

Next, the tagging unit 124 selects each of vertex coordinates, connected to the tagged vertex coordinates based on the first value, as a reference vertex coordinate at step S23. The tagging unit 124 tags all of vertex coordinates having the selected reference vertex coordinates using the first value by the vertex coordinates in the data of the STL file at step S24.

The tagging unit 124 repeatedly performs step S23 and step S24 until a vertex coordinate that is connected to the tagged vertex coordinate and that has not been tagged using the first value is not present at step S25.

If, as a result of the execution at step S25, a vertex coordinate that is connected to the tagged vertex coordinate and that has not been tagged using the first value is found to be not present, this means that there is no vertex coordinate that belongs to the triangles connected from the start vertex coordinate and that has not been tagged using the first value. In this case, unit data including the vertex coordinates tagged using the first value is determined to be data that represents a single object. That is, a combination of the triangles including the vertex coordinates tagged using the first value is a single object.

If, as a result of the execution at step S25, a vertex coordinate that is connected to the tagged vertex coordinate and that has not been tagged using the first value is found to be not present, the tagging unit 124 determines whether a vertex coordinate not tagged to the data of the STL file is present at step S26. In this case, whether another object other than a first object tagged using the first value is present is determined.

If, as a result of the determination at step S26, it is determined that a vertex coordinate not tagged to the data of the STL file is present, this means that another object is present. Accordingly, step S21 to step S25 is performed again, but a second value different from the first value is used when tagging is performed. If step 25 is completed using the second value, this means that a vertex coordinate not tagged to the data of the STL file using the second value is no longer present. In this case, unit data including vertex coordinates tagged using the second value is determined to be data that represent another object different from a previous object. That is, a combination of triangles including the vertex coordinates tagged using the second value is determined to be another single object.

Thereafter, the tagging unit 124 determines whether a vertex coordinate not tagged using the first value or the second value is present. If, as a result of the determination, a vertex coordinate not tagged using the first value or second value is present, this means that yet another object is present. Accordingly, the tagging unit 124 performs step S21 to step S25 again, but uses a third value when performing tagging. If, as a result of the determination, a vertex coordinate not tagged using the first value or second value is not present, the tagging unit 124 completes the operation.

After the tagging using the third value is completed, the tagging unit 124 determines whether a vertex coordinate that has not been tagged is present. If, as a result of the determination, a vertex coordinate that has not been tagged is present, this means that further yet another object is present. Accordingly, the tagging unit 124 performs step S21 to step S25 again, but uses a fourth value when performing tagging. The tagging unit 124 performs such an operation until a vertex that has not been tagged is not present.

Referring back to FIG. 3, the split unit 126 may split each of the objects included in the 3D image based on the tagged vertex coordinates at step S13. For example, the split unit 126 may determine a combination of triangles, including vertex coordinates tagged using a first value, to be a first object, a combination of triangles, including vertex coordinates tagged using a second value, to be a second object, and a combination of triangles, including vertex coordinates tagged using a third value, to be a third object and may split and represent each of the objects.

Figure 8:
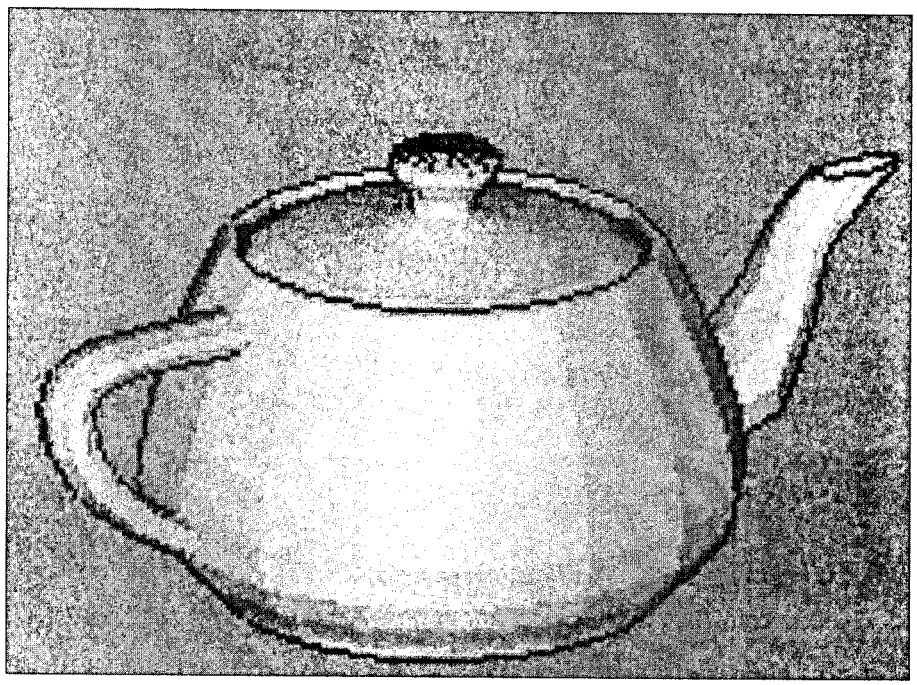
FIG. 8 is an exemplary diagram showing a 3D image of a combined subject according to an STL file which is transmitted by a client terminal.

FIG. 8 is an exemplary diagram showing a 3D image of a combined subject according to an STL file which is transmitted by the client terminal 2. FIG. 8 shows a shape in which the kettle cover, kettle body, and kettle discharge unit of a kettle have been combined.

Figure 9:
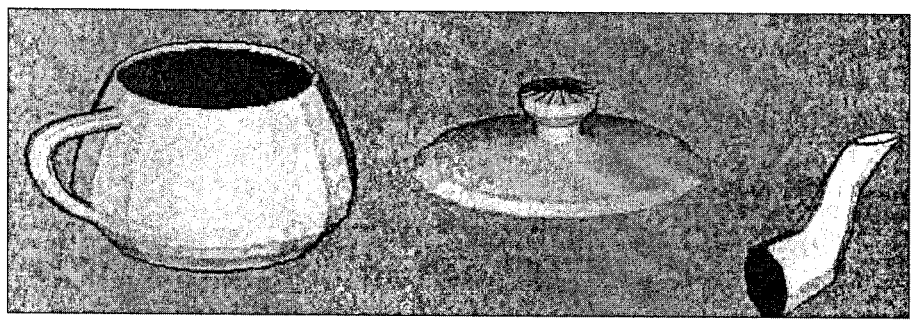
FIG. 9 is an exemplary diagram showing the shapes of a kettle shown in FIG. 8, which has been split by the object split unit for each object.

FIG. 9 is an exemplary diagram showing the shapes of the kettle shown in FIG. 8, which has been split by the object split unit 120 for each object. The kettle cover, kettle body, and kettle discharge unit of the kettle are represented as respective objects.

The file generation unit 128 may generate an STL file corresponding to each of the object at step S14. Such objects and a combined subject are associated with file information and are stored in the database 210.

In a prior art, when an STL file is registered, only file information about a kettle, such as that of FIG. 8, is associated and registered with the database. In contrast, in accordance with the present invention, file information about each of objects forming the kettle, that is, a combined subject, in addition to the kettle is associated and registered. Accordingly, copyright can be protected although only some of objects forming a combined subject are illegally pirated.

As described above, in accordance with the present invention, a 3D image of an STL file can be automatically split easily for each object. Furthermore, file information can be associated with each of objects forming a target in addition to the target when the file is registered through such object splitting.

Although the some embodiments of the present invention have been described above, those skilled in the art will appreciate that the present invention may be modified and changed in various ways without departing from the technical spirit and scope of the present invention. Accordingly, the present invention is not limited to the embodiments and it may be said that the present invention includes all embodiments within the scope of the claims below.

What is claimed is:

1. A method for splitting an object using an apparatus for splitting an object, comprising:
   receiving data of a stereolithography (STL) file representing a 3D image;
   tagging vertex coordinates corresponding to objects included in the 3D image so that the vertex coordinates are classified for each object; and
   splitting each of the objects included in the 3D image based on the tagged vertex coordinates,
   wherein tagging the vertex coordinates corresponding to the objects comprises:
   a start vertex coordinate selection step of selecting any one vertex coordinate which has not been tagged from the data of the STL file as a start vertex coordinate;
   a start vertex coordinate tagging step of tagging all of vertex coordinates having the start vertex coordinate using a first value by tracing the vertex coordinates;
   a reference vertex coordinate selection step of selecting at least one vertex coordinate which is connected to the tagged vertex coordinates and which has not been tagged as a reference vertex coordinate;
   a reference vertex coordinate tagging step of tagging all of vertex coordinates having the selected at least one reference vertex coordinate using the first value by tracking the vertex coordinates; and
   a repetitive execution step of repeatedly performing the reference vertex coordinate selection step and the reference vertex coordinate tagging step until a vertex coordinate which is connected to the tagged vertex coordinates and which has not been tagged is not present.

2. The method of claim 1, wherein splitting each of the objects comprises determining a combination of triangles comprising the vertex coordinates tagged using the first value to be a first object.

3. The method of claim 1, further comprising repeatedly performing the start vertex coordinate selection step, the start vertex coordinate tagging step, the reference vertex coordinate selection step, the reference vertex coordinate tagging step, and the repetitive execution step on the vertex coordinates that have not yet been tagged after the repetitive execution step of repeatedly performing the reference vertex coordinate selection step is completed, wherein a second value is used when the tagging is performed.

4. The method of claim 3, wherein splitting each of the objects comprises determining a combination of triangles comprising the vertex coordinates tagged using the second value to be a second object different from the first object.

5. The method of claim 4, further comprising generating a first STL file representing the first object and a second STL file representing the second object.

6. An apparatus for splitting an object, comprising:
   an input unit configured to receive data of a stereolithography (STL) file representing a 3D image;
   a tagging unit configured to tag vertex coordinates corresponding to objects included in the 3D image so that the vertex coordinates are classified for each object; and
   a split unit configured to split each of the objects included in the 3D image based on the tagged vertex coordinates, wherein:
   the tagging unit performs start vertex coordinate selection for selecting any one vertex coordinate which has not been tagged from the data of the STL file as a start vertex coordinate, start vertex coordinate tagging for tagging all of vertex coordinates having the start vertex coordinate using a first value by tracing the vertex coordinates, reference vertex coordinate selection for selecting at least one vertex coordinate which is connected to the tagged vertex coordinates and which has not been tagged as a reference vertex coordinate, and reference vertex coordinate tagging for tagging all of vertex coordinates having the selected at least one reference vertex coordinate using the first value by tracking the vertex coordinates, and the tagging unit performs repetitive execution for repeatedly performing the reference vertex coordinate selection and the reference vertex coordinate tagging until a vertex coordinate which is connected to the tagged vertex coordinates and which has not been tagged is not present.

7. The apparatus of claim 6, wherein the split unit determines a combination of triangles comprising the vertex coordinates tagged using the first value to be a first object.

8. The apparatus of claim 6, wherein:
the tagging unit repeatedly performs the start vertex coordinate selection, the start vertex coordinate tagging, the reference vertex coordinate selection, the reference vertex coordinate tagging, and the repetitive execution on the vertex coordinates that have not yet been tagged after the repetitive execution for repeatedly performing the reference vertex coordinate selection is completed, and
the tagging unit uses a second value when performing the tagging.

9. The apparatus of claim 8, wherein the split unit determines a combination of triangles comprising the vertex coordinates tagged using the second value to be a second object different from the first object.

10. The apparatus of claim 9, further comprising a file generation unit configured to generate a first STL file representing the first object and a second STL file representing the second object.

11. A method for registering a file using an apparatus for registering a file, comprising:
receiving data of a stereolithography (STL) file representing a 3D image of a combined subject from a client terminal;
tagging vertex coordinates corresponding to objects included in the 3D image so that the vertex coordinates are classified for each object;
splitting each of the objects included in the 3D image based on the tagged vertex coordinates; and
associating the combined subject and each of the split objects with file information and storing the combined subject and the split objects associated with the file information in a database,
wherein tagging the vertex coordinates corresponding to the objects comprises:
a start vertex coordinate selection step of selecting any one vertex coordinate which has not been tagged from the data of the STL file as a start vertex coordinate;
a start vertex coordinate tagging step of tagging all of vertex coordinates having the start vertex coordinate using a first value by tracing the vertex coordinates;
a reference vertex coordinate selection step of selecting at least one vertex coordinate which is connected to the tagged vertex coordinates and which has not been tagged as a reference vertex coordinate;
a reference vertex coordinate tagging step of tagging all of vertex coordinates having the selected at least one reference vertex coordinate using the first value by tracking the vertex coordinates; and
a repetitive execution step of repeatedly performing the reference vertex coordinate selection step and the reference vertex coordinate tagging step until a vertex coordinate which is connected to the tagged vertex coordinates and which has not been tagged is not present.

12. The method of claim 11, further comprising repeatedly performing the start vertex coordinate selection step, the start vertex coordinate tagging step, the reference vertex coordinate selection step, the reference vertex coordinate tagging step, and the repetitive execution step on the vertex coordinates that have not yet been tagged after the repetitive execution step of repeatedly performing the reference vertex coordinate selection step is completed, wherein a second value is used when the tagging is performed.

13. The method of claim 12, wherein splitting each of the objects comprises:
determining a combination of triangles comprising the vertex coordinates tagged using the first value to be a first object, and
determining a combination of triangles comprising the vertex coordinates tagged using the second value to be a second object.

14. The method of claim 13, further comprising generating a first STL file representing the first object and a second STL file representing the second object.

15. An apparatus for registering a file, comprising:
a reception unit configured to receive data of a stereolithography (STL) file representing a 3D image of a combined subject from a client terminal;
an object split unit configured to tag vertex coordinates corresponding to objects included in the 3D image so that the vertex coordinates are classified for each object and to split each of the objects included in the 3D image based on the tagged vertex coordinates; and
a registration unit configured to associate the combined subject and each of the split objects with file information and to store the combined subject and the split objects associated with the file information in a database,
wherein:
the object split unit performs start vertex coordinate selection for selecting any one vertex coordinate which has not been tagged from the data of the STL file as a start vertex coordinate, start vertex coordinate tagging for tagging all of vertex coordinates having the start vertex coordinate using a first value by tracing the vertex coordinates, reference vertex coordinate selection for selecting at least one vertex coordinate which is connected to the tagged vertex coordinates and which has not been tagged as a reference vertex coordinate, and reference vertex coordinate tagging for tagging all of vertex coordinates having the selected at least one reference vertex coordinate using the first value by tracking the vertex coordinates, and
the object split unit performs repetitive execution for repeatedly performing the reference vertex coordinate selection and the reference vertex coordinate tagging until a vertex coordinate which is connected to the tagged vertex coordinates and which has not been tagged is not present.

16. A system for registering a file, comprising:
a first server unit configured to manage a database; and
a second server unit configured to receive data of a stereolithography (STL) file representing a 3D image of a combined subject from a client terminal, tag vertex coordinates corresponding to objects included in the 3D image so that the vertex coordinates are classified for each object, split each of the objects included in the 3D image based on the tagged vertex coordinates, and associate the combined subject and each of the split objects with file information and storing the combined subject and the split objects associated with the file information in a database, wherein:
the second server performs start vertex coordinate selection for selecting any one vertex coordinate which has not been tagged from the data of the STL file as a start vertex coordinate, start vertex coordinate tagging for tagging all of vertex coordinates having the start vertex coordinate using a first value by tracing the vertex coordinates, reference vertex coordinate selection for selecting at least one vertex coordinate which is connected to the tagged vertex coordinates and which has not been tagged as a reference vertex coordinate, and reference vertex coordinate tagging for tagging all of vertex coordinates having the selected at least one reference vertex coordinate using the first value by tracking the vertex coordinates, and performs repetitive execution for repeatedly performing the reference vertex coordinate selection and the reference vertex coordinate tagging until a vertex coordinate which is connected to the tagged vertex coordinates and which has not been tagged is not present.

* * * * *